(12) United States Patent
Byers et al.

(10) Patent No.: US 10,826,762 B2
(45) Date of Patent: Nov. 3, 2020

(54) CONFIGURING RESOURCE-CONSTRAINED DEVICES IN A NETWORK

(71) Applicant: Cisco Technology, Inc., San Jose, CA (US)

(72) Inventors: Charles Calvin Byers, Wheaton, IL (US); Anoop Nannra, Santa Clara, CA (US); Ramanathan Jagadeesan, Saratoga, CA (US); John Parello, Campbell, CA (US); Biren Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 16/056,012

(22) Filed: Aug. 6, 2018

(65) Prior Publication Data
US 2020/0044918 A1 Feb. 6, 2020

(51) Int. Cl.
| | |
|---|---|
| *H04L 12/24* | (2006.01) |
| *H04L 29/06* | (2006.01) |
| *G06F 16/182* | (2019.01) |
| *H04L 12/911* | (2013.01) |
| *H04L 29/08* | (2006.01) |

(52) U.S. Cl.
CPC ........ *H04L 41/0806* (2013.01); *G06F 16/182* (2019.01); *H04L 41/0813* (2013.01); *H04L 41/0856* (2013.01); *H04L 47/74* (2013.01); *H04L 63/08* (2013.01); *H04L 63/20* (2013.01); *H04L 67/10* (2013.01)

(58) Field of Classification Search
CPC ............. H04L 41/0806; H04L 41/0813; H04L 41/0856; H04L 47/74; H04L 63/08; H04L 63/20; H04L 67/10; G06F 16/182
See application file for complete search history.

(56) References Cited

U.S. PATENT DOCUMENTS

| | | | |
|---|---|---|---|
| 10,361,965 B2 * | 7/2019 | Rawlings ............ | H04L 43/0876 |
| 2016/0261690 A1 * | 9/2016 | Ford ..................... | H04L 9/3239 |
| 2018/0109428 A1 * | 4/2018 | Kattepur ............... | H04L 41/145 |
| 2018/0174188 A1 * | 6/2018 | Wilkinson ......... | G06Q 30/0261 |
| 2018/0219676 A1 * | 8/2018 | Mattingly ............ | H04L 9/3239 |
| 2018/0284758 A1 * | 10/2018 | Cella ................. | G05B 23/0229 |

(Continued)

*Primary Examiner* — Uzma Alam
(74) *Attorney, Agent, or Firm* — Behmke Innovation Group LLC; James M. Behmke; James J. Wong (57) ABSTRACT

A method is performed by a first fog node of a plurality of fog nodes. In some implementations, the first fog node includes a non-transitory memory and one or more processors coupled with the non-transitory memory. In some implementations, the method includes maintaining a distributed ledger in coordination with the remaining fog nodes of the plurality of fog nodes. In some implementations, the distributed ledger stores configuration information associated with one or more devices. In some implementations, the method includes obtaining a request for configuration information from a device that breaches a resource threshold associated with the distributed ledger. In some implementations, the method includes transmitting, to the device, the configuration information associated with the device in order to allow the device to be configured in accordance with the configuration information while the device breaches the resource threshold associated with the distributed ledger.

18 Claims, 8 Drawing Sheets

(56) References Cited

U.S. PATENT DOCUMENTS

| | | | |
|---|---|---|---|
| 2018/0331885 A1* | 11/2018 | Raymond | H04L 47/805 |
| 2019/0098432 A1* | 3/2019 | Carlson | G06Q 10/083 |
| 2019/0158470 A1* | 5/2019 | Wright | H04L 9/085 |
| 2019/0166101 A1* | 5/2019 | Ramos | G06F 21/6245 |
| 2019/0213100 A1* | 7/2019 | Tayeb | G06F 11/3058 |
| 2019/0349426 A1* | 11/2019 | Smith | H04L 67/104 |

* cited by examiner

CONFIGURING RESOURCE-CONSTRAINED DEVICES IN A NETWORK

TECHNICAL FIELD

The present disclosure relates generally to configuring devices, and in particular, to configuring resource-constrained devices in a network.

BACKGROUND

Internet of Things (IoT) networks include numerous devices of various types. Different types of devices in an IoT network have different capabilities. For example, different types of devices in an IoT network have access to different levels of resources (e.g., different processor power, memory, storage, network bandwidth, etc.). Some types of devices may have access to relatively few resources while other types of devices may have access to relatively more resources. In some previous available networks, some devices obtain configuration information from a remote source. When a device obtains configuration information from a remote source there is a risk that the configuration information is not suitable for the device. In some scenarios, the configuration information includes malicious information that, if used by the device, can have an adverse impact on the operation of the device. Additionally, some devices in a previously available network may not be able to obtain configuration information from a remote source (e.g., due to network failures or overloads).

BRIEF DESCRIPTIONS OF THE DRAWINGS

For a better understanding of aspects of the various implementations described herein and to show more clearly how they may be carried into effect, reference is made, by way of example only, to the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for configuring resource-constrained devices in a network. In various implementations, a method is performed by a first fog node of a plurality of fog nodes. In some implementations, the first fog node includes a non-transitory memory and one or more processors coupled with the non-transitory memory. In some implementations, the method includes maintaining a distributed ledger in coordination with the remaining fog nodes of the plurality of fog nodes. In some implementations, the distributed ledger stores configuration information associated with one or more devices. In some implementations, the method includes obtaining a request for configuration information from a device that breaches a resource threshold associated with the distributed ledger. In some implementations, the method includes transmitting, to the device, the configuration information associated with the device in order to allow the device to be configured in accordance with the configuration information while the device breaches the resource threshold associated with the distributed ledger.

EXAMPLE EMBODIMENTS

Figure 1:
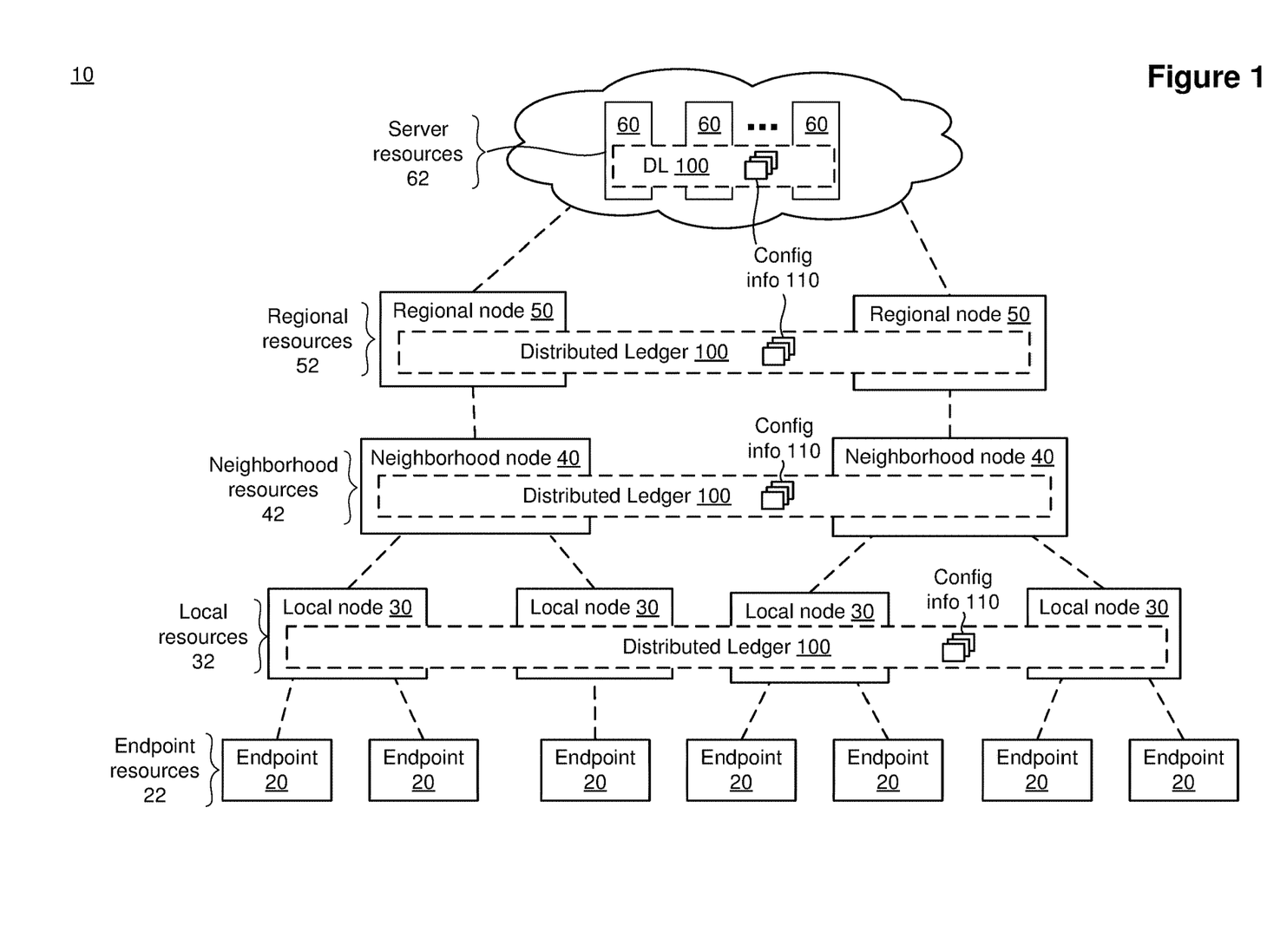
FIG. 1 is a schematic diagram of a network environment in accordance with some implementations.

FIG. 1 is a schematic diagram of a network environment 10. While certain specific features are illustrated, those of ordinary skill in the art will appreciate from the present disclosure that various other features have not been illustrated for the sake of brevity and so as not to obscure more pertinent aspects of the example implementations disclosed herein. To that end, the network environment 10 includes endpoint devices 20 ("endpoints 20", hereinafter for the sake of brevity), local fog nodes 30, neighborhood fog nodes 40, regional fog nodes 50 and cloud computing servers 60. As illustrated in FIG. 1, in various implementations, the endpoints 20, the local fog nodes 30, the neighborhood fog nodes 40, the regional fog nodes 50 and the cloud computing servers 60 collectively form a hierarchical fog computing system.

In some implementations, a fog node refers to a distributed network element that is located proximate to an edge of the network environment 10 and/or the endpoints 20. In some implementations, the endpoints 20 include sensors, actuators and/or other IoT devices. In various implementations, the endpoints 20 have relatively fewer resources (e.g., in order to maintain a lower cost, size, power consumption and/or thermal profile of the endpoints 20). As such, in various implementations, the endpoints 20 are resource-constrained. In some implementations, fog nodes higher in the hierarchical fog computing system (e.g., proximate to the cloud computing servers 60, for example, the regional fog nodes 50) have access to more resources than fog nodes that are lower in the hierarchical fog computing system (e.g., distant from the cloud computing servers 60, for example, the local fog nodes 30).

In various implementations, the local fog nodes 30, the neighborhood fog nodes 40, the regional fog nodes 50 and the cloud computing servers 60 maintain a distributed ledger 100 in coordination with each other. In some implementations, the distributed ledger 100 stores configuration information 110 for the endpoints 20. In some implementations, each of the local fog nodes 30, the neighborhood fog nodes 40, the regional fog nodes 50 and the cloud computing server 60 stores an instance (e.g., a copy) of the distributed ledger 100. As such, the configuration information 110 is distributed across the local fog nodes 30, the neighborhood fog nodes 40, the regional fog nodes 50 and the cloud computing servers 60. Since the configuration information 110 is distributed across various fog nodes, the configuration information 110 is less prone to a data loss event (e.g., a hard disk failure, a fire, etc.).

In various implementations, the configuration information 110 is stored in the distributed ledger 100 after a consensus is reached between the fog nodes that are maintaining the distributed ledger. In some implementations, the configuration information 110 is stored in the distributed ledger 100 after a majority (e.g., more than fifty percent) of the fog nodes maintaining the distributed ledger 110 agree to store the configuration information 110 in the distributed ledger 100. In some implementations, updates to the configuration information 110 require a consensus between the fog nodes maintaining the distributed ledger. Since a single fog node cannot store and/or make changes to the configuration information 110 until a consensus is reached between the fog nodes maintaining the distributed ledger 100, the configuration information 110 is less prone to being changed by a malicious entity. As such, the configuration information 110 satisfies a chain of trust indicating an authenticity of the configuration information 110 (e.g., that the configuration information 110 has not been tampered with, and/or its history and/or provenance are trustworthy).

In various implementations, the configuration information 110 refers to information that is used to configure the endpoints 20. In some implementations, the configuration information 110 includes executable instructions that are executed by the endpoints 20. In some implementations, the configuration information 110 specifies an operating schedule for the endpoints 20 (e.g., time period(s) during which the endpoints 20 are to remain ON, and/or time period(s) during which the endpoints 20 are to remain OFF). In some implementations, the configuration information 110 specifies an operating mode for the endpoints 20 (e.g., low power mode, passive mode, active mode, etc.). In some implementations, the configuration information 110 specifies a frequency and/or time at which the endpoints 20 are to transmit data (e.g., transmit sensor data captured by the endpoints 20) to their parent local fog nodes 30).

In some implementations, the configuration information 110 is stored as configuration files. For example, the configuration information 110 for different types of endpoints 20 is stored in different configuration files. In some implementations, the configuration information 110 includes software, firmware, FPGA configurations, network settings, orchestration control data, security data, management data, hardware configuration data, permissions, blacklists, whitelists, and/or authentication data. In some implementations, entities other than the endpoints 20 receive the configuration information 110. For example, in some implementations, if a local fog node 30 is resource-constrained, a neighborhood fog node 40 provides the configuration information 110 to the local fog node 30 in accordance with the methods described herein.

In some implementations, the configuration information 110 is determined (e.g., generated or synthesized) by entities that exercise control over the endpoints 20 (e.g., a manufacturer of the endpoints 20, an owner of the endpoints 20, a service provider that manages the endpoints 20, etc.). In some implementations, the configuration information 110 for different endpoints 20 is determined by different entities. In some implementations, one of the cloud computing servers 60 determines the configuration information 110. In some implementations, one of the cloud computing servers 60 receives the configuration information 110 from a remote source (not shown). In some implementations, the configuration information 110 is added to (e.g., stored in) the distributed ledger 100 if the configuration information 110 is accompanied by a digital signature generated by entity that exercises control over the endpoints 20. In various implementations, the configuration information 110 is trustworthy because the configuration information 110 is generated by a trusted entity (e.g., a trusted authority). In various implementations, the distributed ledger 100 indicates that the configuration information 110 has not been modified.

In the example of FIG. 1, the distributed ledger 100 is maintained by fog nodes that are at different hierarchical levels of the fog computing system. For example, the distributed ledger 100 is maintained by local fog nodes 30 that are at a local hierarchical level, neighborhood fog nodes 40 that are at a neighborhood hierarchical level, regional fog nodes 50 that are at a regional hierarchical level, and cloud computing servers 60 that are at a cloud hierarchical level. In some implementations, however, the distributed ledger 100 is maintained by fog nodes at fewer hierarchical levels. For example, in some implementations, the distributed ledger 100 is maintained by the local fog nodes 30 at the local hierarchical level, the neighborhood fog nodes 40 at the neighborhood hierarchical level and/or the regional fog nodes 50 at the regional hierarchical level.

In various implementations, the endpoints 20 include endpoint resources 22, the local fog nodes 30 include local fog node resources 32, the neighborhood fog nodes 40 include neighborhood fog node resources 42, the regional fog nodes 50 include regional fog node resources 52, and the cloud computing servers 60 include cloud computing server resources 62. In some implementations, resources refer to computing resources such as processor resources (e.g., a number of processors and/or an amount of processing time). In some implementations, resources refer to memory resources such as an amount of memory, a type of memory and/or a speed at which read/writes are performed. In some implementations, resources refer to network resources such as radio resources (e.g., a wireless transceiver such as a cellular transceiver, a wired transceiver, and/or frequency or bandwidth allocations). In some implementations, resources refer to power resources (e.g., an amount of power available, a battery capacity, etc.).

Figure 2A:
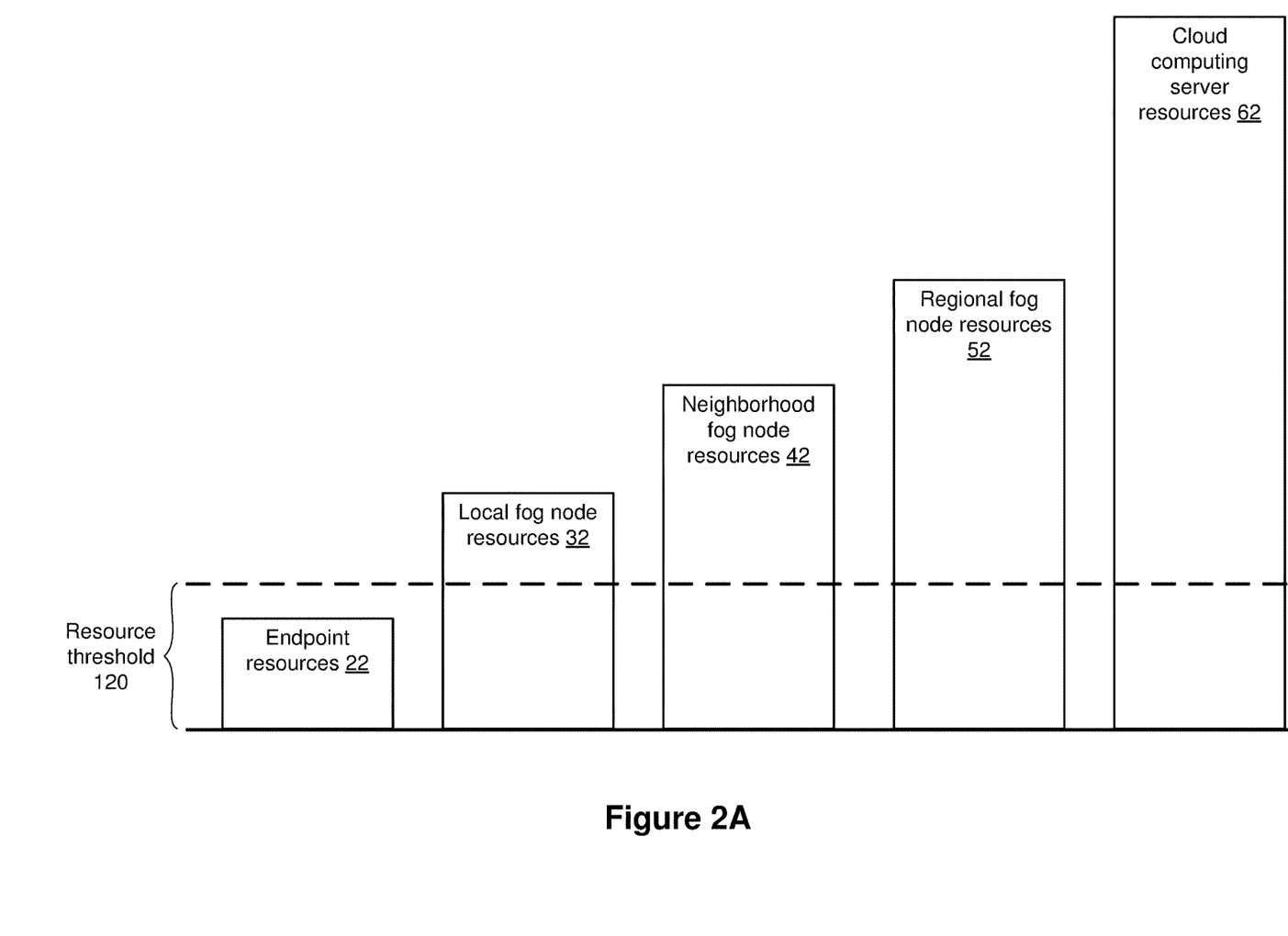
FIG. 2A is a block diagram illustrating a resource threshold associated with a distributed ledger in accordance with some implementations.

Referring to FIG. 2A, in some implementations, the distributed ledger 100 is associated with a resource threshold 120. In some implementations, the resource threshold 120 indicates one or more resources to maintain the distributed ledger 100. For example, the resource threshold 120 specifies a list of resources that are required to maintain the distributed ledger 100. In some implementations, the resource threshold 120 specifies a level of resources that are required to maintain the distributed ledger 100. In some examples, the resource threshold 120 indicates an amount of processing resources, an amount of memory resources and/or an amount of networking resources that are required to maintain the distributed ledger 100.

In some implementations, the resource threshold 120 is a function of a size of the distributed ledger 100. In such implementations, as the size of the distributed ledger 100 increases, the resource threshold 120 increases. For example, as the size of the distributed ledger 100 increases, an amount of memory required to store the distributed ledger increases and/or an amount of processing power required to search the distributed ledger increases. In some implementations, as the size of the distributed ledger 100 decreases, the resource threshold 120 decreases.

In the example of FIGS. 1-2A, the endpoints 20 breach the resource threshold 120 because the endpoint resources 22 do not include all the resources indicated by the resource threshold 120. Since the endpoints 20 breach the resource threshold 120 associated with the distributed ledger 100, the endpoints 20 cannot maintain the distributed ledger 100. In other words, since the endpoints 20 do not have sufficient resources to maintain the distributed ledger 100, the endpoints 20 cannot maintain the distributed ledger 100. As such, the endpoints 20 cannot directly retrieve the configuration information 110 from the distributed ledger 100. Since the endpoints 20 have fewer resources, the endpoints 20 are typically cheaper, lighter, less complex and require less power than a device that satisfies the resource threshold 120.

In the example of FIGS. 1-2A, the local fog nodes 30, the neighborhood fog nodes 40, the regional fog nodes 50 and the cloud computing servers 60 satisfy the resource threshold 120 because the local fog node resources 32, the neighborhood fog node resources 42, the regional fog node resources 52 and the cloud computing server resources 62, respectively, include all the resources indicated by the resource threshold 120. As such, the local fog nodes 30, the neighborhood fog nodes 40, the regional fog nodes 50 and the cloud computing servers 60 have sufficient resources to maintain the distributed ledger 100.

In some implementations, the resource threshold 120 changes as the size of the distributed ledger 100 changes. For example, the resource threshold 120 increases as the distributed ledger 100 grows in size. As such, in some implementations, the resource threshold 120 exceeds the local fog node resources 32. In such implementations, the local fog nodes 32 breach the resource threshold 120 because the local fog node resources 32 do not include all the resources indicated by the resource threshold 120. In such implementations, the local fog nodes 30 are no longer capable of maintaining the distributed ledger 100. As such, in such implementations, the local fog nodes 30 cease to maintain the distributed ledger 100, and the neighborhood fog nodes 40, the regional fog nodes 50 and the cloud computing servers 60 maintain the distributed ledger 100 in coordination with each other.

Figure 2B:
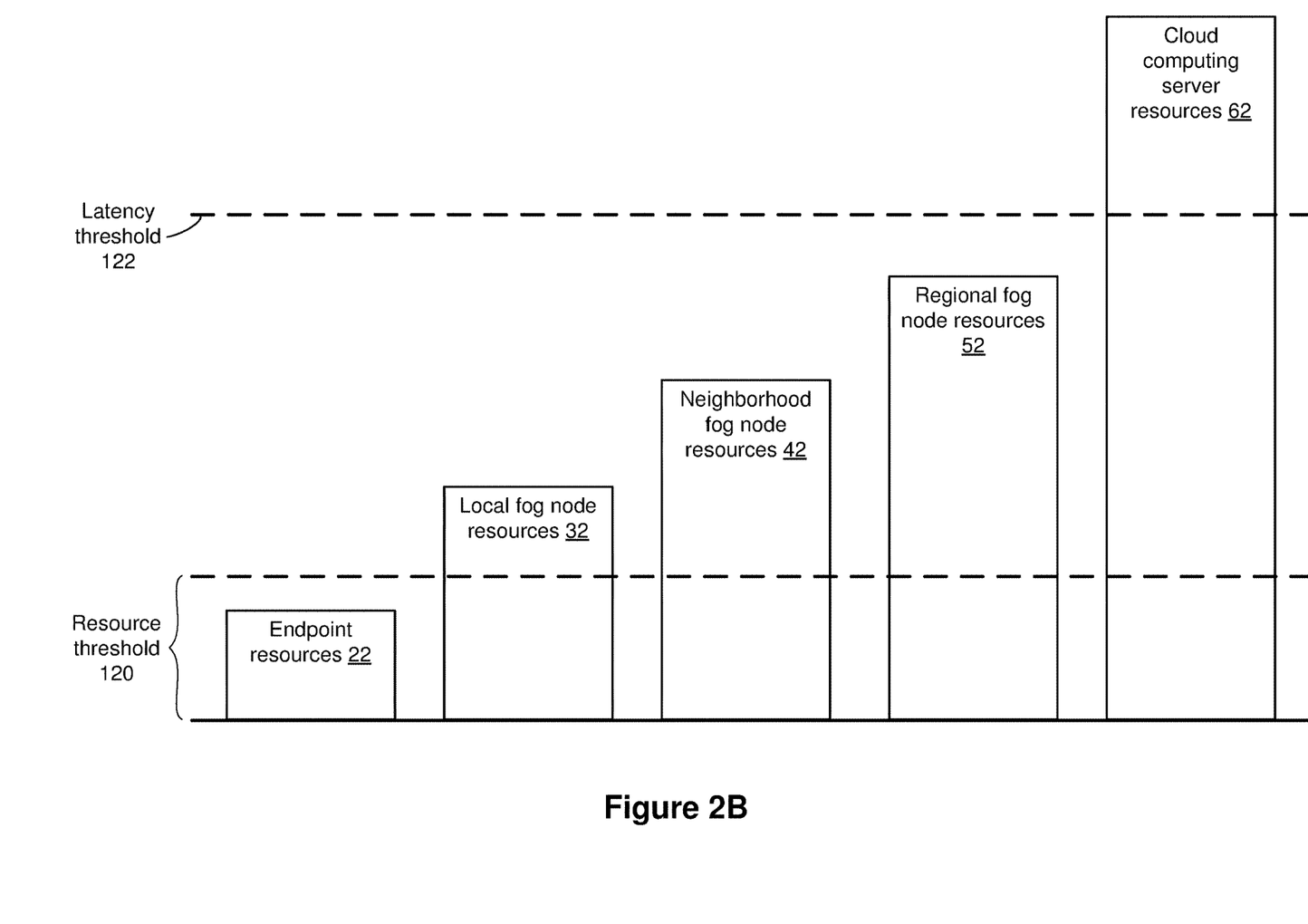
FIG. 2B is a block diagram illustrating a latency threshold associated with the distributed ledger in accordance with some implementations.

Referring to FIG. 2B, in some implementations, the distributed ledger 100 is associated with a latency threshold 122. In some implementations, the latency threshold 122 indicates a time period (e.g., 20 milliseconds) during which operations related to the distributed ledger 100 are to be completed. For example, the latency threshold 122 indicates an amount of time during which consensus has to be established between the entities maintaining the distributed ledger 100. In some implementations, resources that are situated higher in the hierarchical fog computing system (e.g., distant from the endpoints 20, for example, the cloud computing server resources 62) are relatively slower than resources that are situated lower in the hierarchical fog computing system (e.g., proximate to the endpoints 20, for example, the local fog node resources 32). As illustrated in the example of FIG. 2B, the cloud computing server resources 62 breach the latency threshold 122. In some implementations, the cloud computing server resources 62 breach the latency threshold 122 because the cloud computing server resources 62 are unable to perform operations related to the distributed ledger 100 within a time period indicated by the latency threshold 122. In the example of FIG. 2B, the local fog node resources 32, the neighborhood fog node resources 42, and the regional fog node resources 52 satisfy the latency threshold, for example, because the local fog node resources 32, the neighborhood fog node resources 42 and the regional fog node resources 52 are able to perform operations related to the distributed ledger 100 within the time period indicated by the latency threshold 122.

In some implementations, the distributed ledger 100 is maintained by fog nodes that satisfy the resource threshold 120 and the latency threshold 122. In the example of FIG. 2B, the distributed ledger 100 is maintained by the local fog node 30s, the neighborhood fog nodes 40 and the regional fog nodes 50, but not the cloud computing servers 60 and the endpoints 20. In some implementations, the latency threshold 122 is a function of one or more distributed ledger applications hosted by the distributed ledger 100. In some implementations, when the distributed ledger 100 begins hosting a relatively high priority distributed ledger application, the latency threshold 122 decreases. In such implementations, if the latency threshold 122 decreases to such an extent that the regional fog node resources 52 breach the latency threshold 122 then the regional fog nodes 50 cease to maintain the distributed ledger 100. In some implementations, when the distributed ledger 100 stops hosting a relatively high priority distributed ledger application, the latency threshold 122 increases. In such implementations, if the latency threshold 122 increases to such an extent that the cloud computing server resources 62 satisfy the latency threshold 122, then the cloud computing servers 60 resume maintaining the distributed ledger 100. More generally, in various implementations, as the resource threshold 120 and/or the latency threshold 122 change, different hierarchies of the hierarchical fog computing system maintain the distributed ledger 100.

Figure 3A:
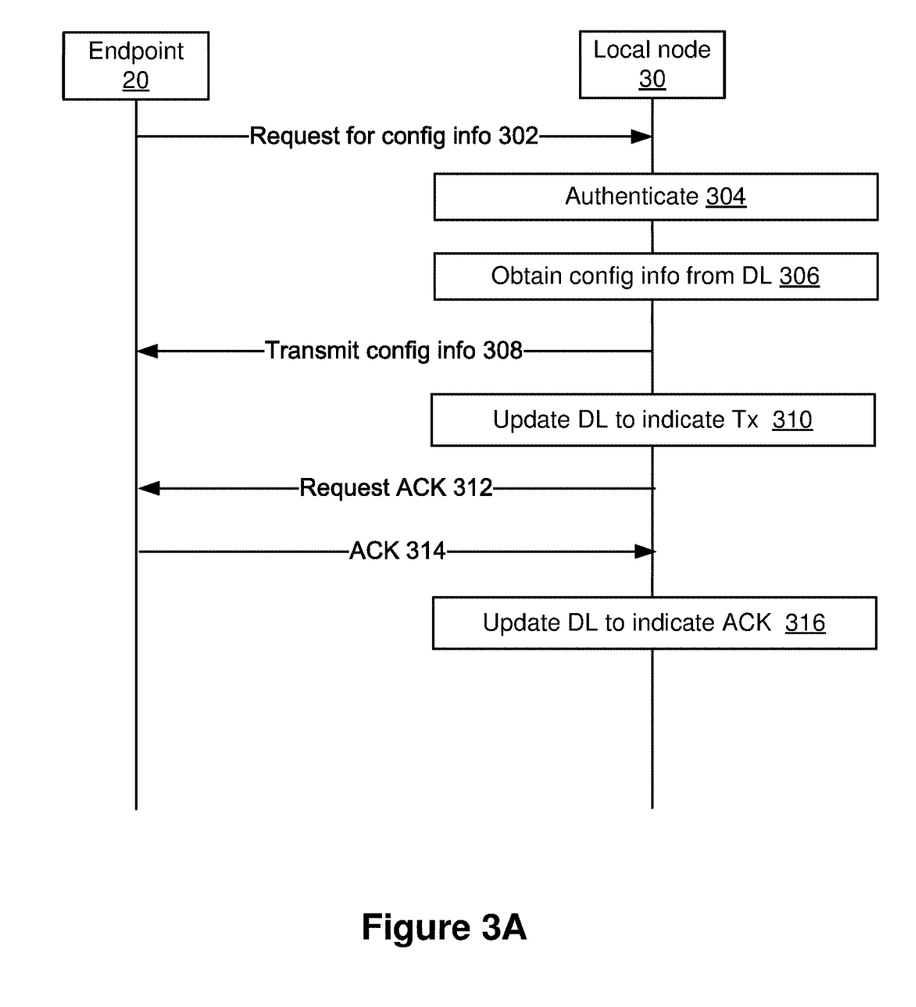
FIGS. 3A-3B are sequence diagrams illustrating various operations performed by an endpoint device and a local fog node in accordance with some implementations.

FIG. 3A illustrates operations that are performed by an endpoint 20 and a local fog node 30 that is above the endpoint 20 in the hierarchical fog computing system. At 302, the local fog node 30 obtains a request for configuration information. In some implementations, the endpoint 20 transmits the request to the local fog node 30, and the local fog node 30 receives the request from the endpoint 20. In some implementations, the local fog node 30 obtains the request when the endpoint 20 is being setup (e.g., for the first time). In some implementations, the local fog node 30 obtains the request when the endpoint 20 is turned ON (e.g., for the first time). In some implementations, the local fog node 30 obtains the request when the endpoint 20 is reset (e.g., in response to a soft reset such as a reboot or restart, and/or in response to a hard reset such as a factory reset). In some implementations, the local fog node 30 obtains the request periodically (e.g., once a day, once a week, once a month, or once a year). In some implementations, the local fog node 30 obtains the request when the endpoint 20 detects an abnormal condition (e.g., a suspected security breach and/or a performance deficit).

At 304, the local fog node 30 authenticates the request. In some implementations, the local fog node 30 authenticates the request based on information stored in the distributed ledger 100. In some implementations, the local fog node 30 determines whether the endpoint 20 is authorized to transmit the request. In some such implementations, the local fog node 30 queries the distributed ledger 100 with an identifier (ID) of the endpoint 20 (e.g., a MAC address of the endpoint 20), and receives a response indicating whether the endpoint 20 is authorized to be part of a network (e.g., an IoT network). In some implementations, if the local fog node 30 is successful at authenticating the request, then the local fog node 30 performs operation 306, otherwise the local fog node 30 discards the request.

At 306, the local fog node 30 obtains the configuration information 110 for the endpoint 20 from the distributed ledger 100. In some implementations, the local fog node 30 queries the distributed ledger 100 with an ID of the endpoint 20 and receives the configuration information 110 for the endpoint 20 in response to the query.

At 308, the local fog node 30 transmits the configuration information 110 for the endpoint 20 to the endpoint 20. Transmitting the configuration information 110 to the endpoint 20 allows the endpoint 20 to configure itself in accordance with the configuration information 110. Since the local fog node 30 transmits the configuration information 110 to the endpoint 20, the endpoint 20 is able to configure itself even though the endpoint 20 breaches the resource threshold 120 and does not have enough resources to maintain and/or access the distributed ledger 100.

At 310, the local fog node 30 updates the distributed ledger 100 to indicate that the local fog node 30 has transmitted the configuration information 110 to the endpoint 20. At 312, the local fog node 30 requests the endpoint 20 to provide an acknowledgement. At 314, the endpoint 20 transmits an acknowledgement, and the local fog node 30 receives the acknowledgement. In some implementations, the acknowledgement indicates that the endpoint 20 has received the configuration information 110. In some implementations, the acknowledgement indicates that the configuration information 110 is valid. For example, in some implementations, the acknowledgement indicates that the endpoint 20 was successful at executing instructions included in the configuration information 110.

At 316, the local fog node 30 updates the distributed ledger 100 to indicate the acknowledgement. In some implementations, the local fog node 30 updates the distributed ledger 100 to indicate that the endpoint 20 received the configuration information 110 from the local fog node 30. In some implementations, the local fog node 30 updates the distributed ledger 100 to indicate that the configuration information 110 sent to the endpoint 20 is valid. In some implementations, if the local fog node 30 updates the distributed ledger 100 to indicate that the endpoint 20 was successful at using the configuration information 110 to configure itself, then other fog nodes continue to provide the configuration information 110 to other endpoints. In some implementations, updates to the distributed ledger 100 include updated times, version numbers, requesting user IDs, and/or other metadata. However, in some implementations, if the local fog node 30 updates the distributed ledger 100 to indicate that the endpoint was not successful at using the configuration information 110 to configure itself, then other fog nodes cease to provide the configuration information 110 to other endpoints.

Figure 3B:
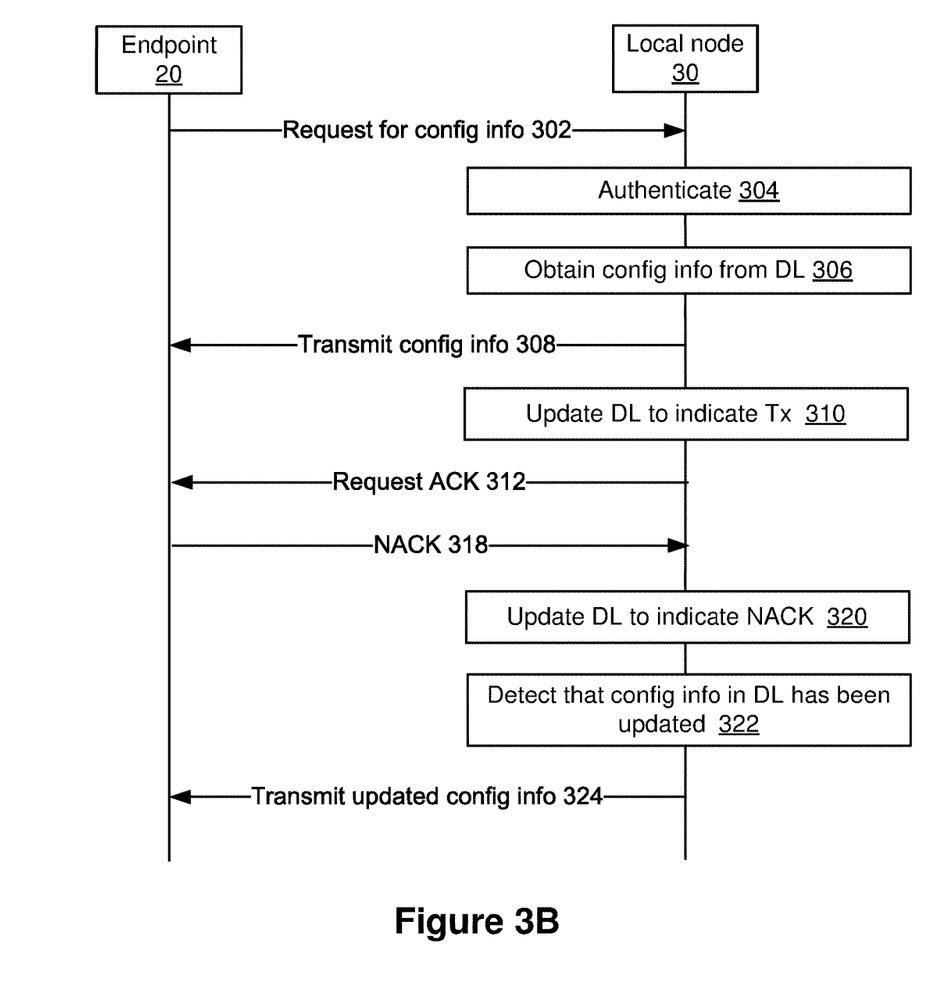

Referring to FIG. 3B, as represented by operation 318, in some implementations, the endpoint 20 transmits a negative acknowledgement to the local fog node 30. In some implementations, the negative acknowledgement indicates that the endpoint 20 was unsuccessful at configuring itself in accordance with the configuration information 110 that the local fog node 30 transmitted to the endpoint 20. In some implementations, the negative acknowledgement indicates that the configuration information 110 that the local fog node 30 transmitted to the endpoint 20 is invalid (e.g., the configuration information 110 included instructions that the endpoint 20 was not successful at executing).

At 320, the local fog node 30 updates the distributed ledger 100 to indicate the negative acknowledgement. In some implementations, updating the distributed ledger 100 to indicate the negative acknowledgement serves as a request, to fog nodes that are higher in the hierarchical fog computing system, to update the configuration information. For example, in some implementations, after detecting an indication of the negative acknowledgement on the distributed ledger 100, one of the cloud computing servers 60 requests an entity, that provided the configuration information 110, to provide updated configuration information. In such implementations, the cloud computing server 60 stores the updated configuration information in the distributed ledger 100 in response to obtaining the updated configuration information. In some implementations, the local fog node 30 writes metadata indicative of the configuration failure into the distributed ledger 100 (e.g., error messages, log files, and/or network statistics).

At 322, the local fog node 30 detects that the configuration information 110 has been updated. At 324, the local fog node 30 transmits the updated configuration information to the endpoint 20.

Figure 4:
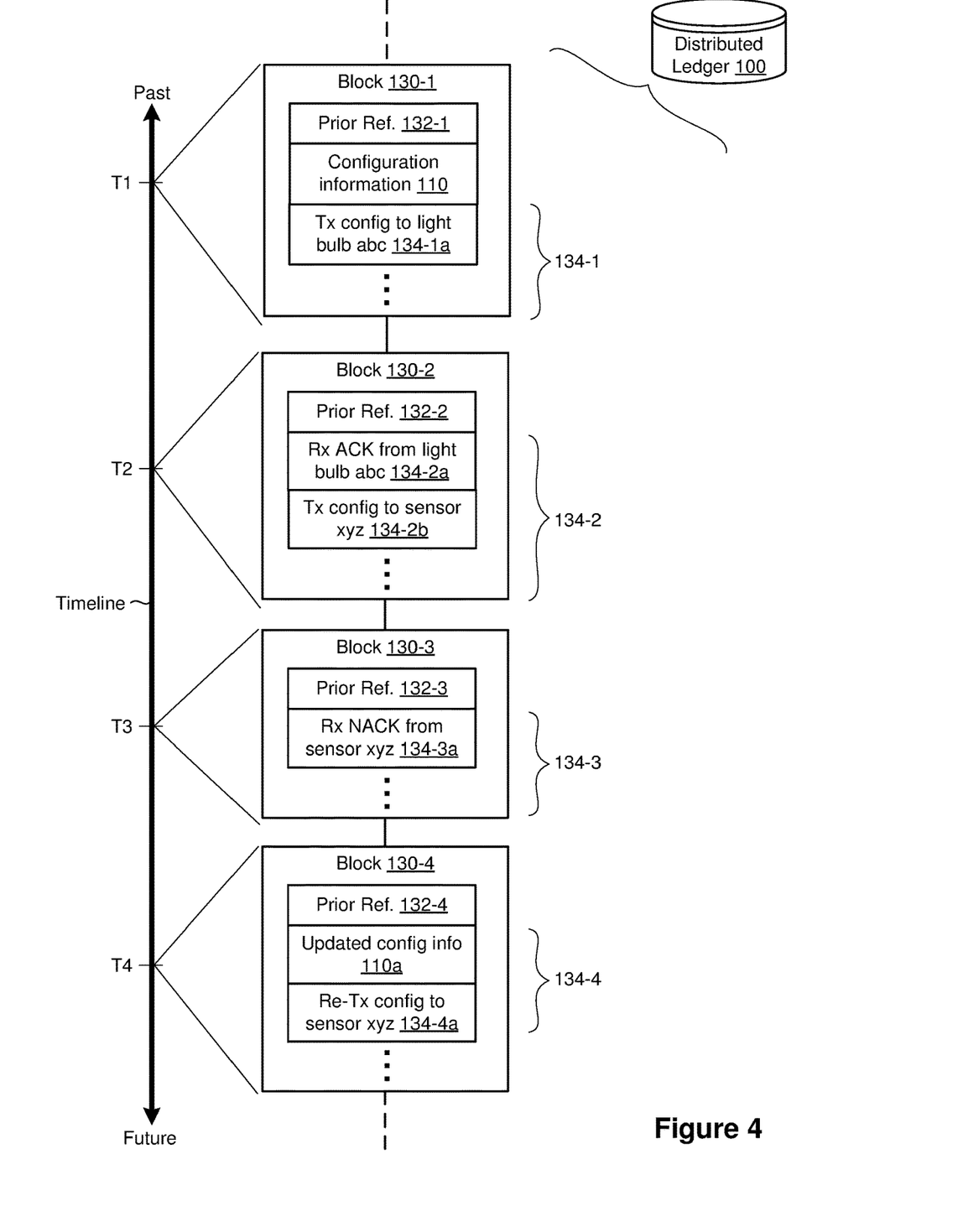
FIG. 4 is a block diagram illustrating various blocks of a distributed ledger in accordance with some implementations.

FIG. 4 is a block diagram of the distributed ledger 100 in accordance with some implementations. This example implementation illustrates a first block 130-1, a second block 130-2, a third block 130-3, and a fourth block 130-4. As illustrated by the timeline, the first block 130-1 was added to the distributed ledger 100 at time T1, the second block 130-2 was added to the distributed ledger 100 at time T2, the third block 130-3 was added to the distributed ledger 100 at time T3, and the fourth block 130-4 was added to the distributed ledger 100 at time T4. In various implementations, the distributed ledger 100 monitors/records a time difference between block additions. In various implementations, the first block 130-1 includes a reference 132-1 to a prior block (not shown), the second block 130-2 includes a reference 132-2 to the first block 130-1, the third block 130-3 includes a reference 132-3 to the second block 130-2, and the fourth block 130-4 includes a reference 132-4 to the third block 130-3.

In various implementations, the first block 130-1 includes a first set of transactions 134-1, the second block 130-2 includes a second set of transactions 134-2, the third block 130-3 includes a third set of transactions 134-3, and the fourth block 130-4 includes a fourth set of transactions 134-4. In the example of FIG. 4, the first block 130-1 includes the configuration data 110.

The first block 130-1 includes a transaction 134-1a indicating that configuration information was transmitted to light bulb abc. The second block 130-2 includes a transaction 134-2a indicating that an acknowledgement was received from light bulb abc indicating that light bulb abc was successful at configuring itself based on the configuration information.

The second block 130-2 includes another transaction 134-2b indicating that configuration information was transmitted to sensor xyz. The third block 130-3 includes a transaction 134-3a indicating that a negative acknowledgement was received from sensor xyz indicating that sensor xyz was unsuccessful at configuring itself based on the configuration information. The fourth block 130-4 includes updated configuration information 110a. The fourth block 1304 includes a transaction 134-4a indicating that the updated configuration information 110a was transmitted to sensor xyz.

Figure 5:
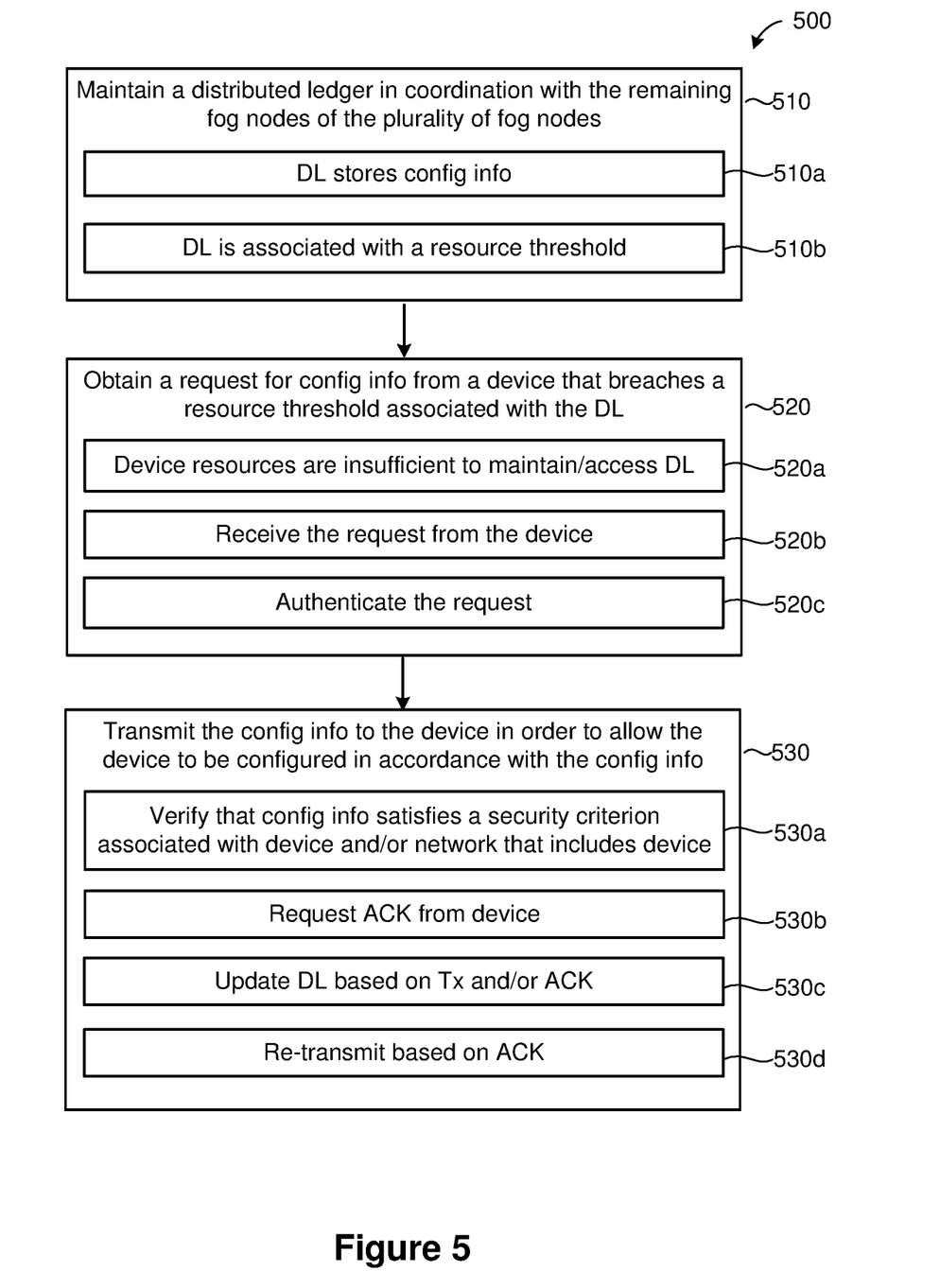
FIG. 5 is a flowchart representation of a method for configuring resource-constrained devices in a network in accordance with some implementations.

FIG. 5 is a flowchart representation of a method 500 for transmitting configuration information to resource-constrained devices in a network. In various implementations, the method 500 is implemented as a set of computer readable instructions that are executed at a device (e.g., a fog node of a plurality of fog nodes, for example, one or more of the local fog nodes 30, the neighborhood fog nodes 40, the regional fog nodes 50 and/or the cloud computing servers 60 shown in FIG. 1). Briefly, the method 500 includes maintaining a distributed ledger in coordination with the remaining fog nodes, obtaining a request for configuration information from a device that breaches a resource threshold associated with the distributed ledger, and transmitting the configuration information to the device in order to allow the device to be configured in accordance with the configuration information.

As represented by block 510, in some implementations, the method 500 includes maintaining a distributed ledger (e.g., the distributed ledger 100 shown in FIGS. 1 and 4) in coordination with the remaining fog nodes of the plurality of fog nodes. As represented by block 510a, in some implementations, the distributed ledger stores configuration information associated with one or more devices (e.g., the configuration information 110 for the endpoints 20 shown in FIG. 1). As represented by block 510b, in some implementations, the distributed ledger is associated with a resource threshold (e.g., the resource threshold 120 shown in FIG. 2A). In some implementations, the resource threshold indicates one or more resources (e.g., all the resources) that are required to maintain the distributed ledger. In some implementations, the resource threshold indicates one or more resources that are required to access the distributed ledger. As described herein, in some implementations, the distributed ledger is associated with a latency threshold (e.g., the latency threshold 122 shown in FIG. 2B). In such implementations, entities that satisfy the latency threshold and the resource threshold maintain the distributed ledger, whereas entities that breach the latency threshold or the resource threshold do not maintain the distributed ledger (e.g., in the example of FIG. 2B, the local fog nodes 30, the neighborhood fog nodes 40 and the regional fog nodes 50 maintain the distributed ledger 100, whereas the endpoints 20 and the cloud computing servers 60 do not maintain the distributed ledger 100).

As represented by block 520, in some implementations, the method 500 includes obtaining a request for configuration information from a device that breaches a resource threshold associated with the distributed ledger (e.g., one of the endpoints 20 shown in FIG. 1). As represented by block 520a, in some implementations, the device breaches the resource threshold because the device does not have sufficient resources to maintain the distributed ledger (e.g., a memory of the device is smaller than a memory indicated by the resource threshold). In some implementations, the device breaches the resource threshold because the device does not have sufficient resources to access the distributed ledger (e.g., the device does not include a cellular transceiver, for example, due to cost and/or power consumption). More generally, in various implementations, the device breaches the resource threshold associated with the distributed ledger because the resources of the device do not include one or more resources indicated by the resource threshold (e.g., as shown in FIG. 2A, the endpoint resources 22 do not include one or more resources indicated by the resource threshold 120).

As represented by block 520b, in some implementations, the method 500 includes receiving the request from the device. In some implementations, the method 500 includes receiving the request when the device is being setup (e.g., for the first time). In some implementations, the method 500 includes receiving the request when the device is powered ON (e.g., for the first time). In some implementations, the method 500 includes receiving the request when the device is reset (e.g., when the device undergoes a hard reset such as a factory reset, and/or when the device undergoes a soft reset such as a reboot or restart). In some implementations, the method 500 includes receiving the request periodically (e.g., once a day, once a week, once a month, or once a year). In some implementations, the method 500 includes obtaining the request in response to an occurrence of an abnormal condition (e.g., a suspected security breach and/or a performance deficit at the endpoint 20 shown in FIG. 1)

As represented by block 520c, in some implementations, the method 500 includes authenticating the request. In some implementations, the method 500 includes determining, based on information stored in the distributed ledger, whether the device requesting the configuration information is authorized to request the configuration information. In such implementations, if the distributed ledger indicates that the device is authorized to request the configuration information then the request is authenticated, otherwise the request fails authentication. In some implementations, the method 500 includes determining, based on information stored in the distributed ledger, whether the device is part of a network (e.g., an IoT network). In such implementations, if the distributed ledger indicates that the device is part of the network then the request is authenticated, otherwise the request fails authentication. In some implementations, the method 500 includes discarding the request in response to a failure to authenticate the request. In some implementations, the method 500 proceeds to block 530 in response to a successful authentication of the request.

As represented by block 530, in some implementations, the method 500 includes transmitting, to the device, the configuration information associated with the device in order to allow the device to be configured in accordance with the configuration information while the device breaches the resource threshold associated with the distributed ledger. As such, the fog node allows the device to be configured in accordance with the configuration information even though the device does not have sufficient resources to maintain and/or access the distributed ledger.

As represented by block 530a, in some implementations, the method 500 includes verifying that the configuration information satisfies a security criterion associated with the device and/or the network that includes the device. In some implementations, the device does not have enough resources to verify the configuration information in relation to the security criterion. As such, the fog node verifies that the configuration information satisfies the security criterion. In some implementations, verifying the configuration information in relation to the security criterion includes scanning the configuration information for malicious code (e.g., malware). In some implementation, verifying the configuration information in relation to the security criterion includes verifying that the configuration information satisfies security policies associated with the device and/or the network that includes the device. In some implementations, the method 500 includes verifying the configuration information in relation to the security criterion before the configuration information in stored in the distributed ledger. In some implementations, there are numerous security criteria, and the method 500 includes verifying that the configuration information satisfies each of the security criteria.

As represented by block 530*b*, in some implementations, the method 500 includes requesting an acknowledgement from the device. In some implementations, the method 500 includes requesting the acknowledgement after transmitting the configuration information. In some implementations, the method 500 includes requesting the acknowledgement concurrently with transmitting the configuration information.

As represented by block 530*c*, in some implementations, the method 500 includes updating the distributed ledger to indicate the transmission of the configuration information and/or to indicate the receipt of an acknowledgement. In some implementations, the method 500 includes receiving an acknowledgment indicating that the device was successful at configuring itself in accordance with the configuration information. In such implementations, the method 500 includes updating the distributed ledger to indicate that the configuration information is valid. In some implementations, the method 500 includes receiving a negative acknowledgment indicating that the device was unsuccessful at configuring itself in accordance with the configuration information. In such implementations, the method 500 includes updating the distributed ledger to indicate that the configuration information is invalid (e.g., possibly invalid, for example, there is a likelihood that the configuration information is invalid).

As represented by block 530*d*, in some implementations, the method 500 includes re-transmitting the configuration information based on the acknowledgement. In some implementations, the method 500 includes re-transmitting the same configuration information to the device in response to the acknowledgement indicating that there was a transmission error. In some implementations, the method 500 includes transmitting updated configuration information to the device after detecting that the configuration information in the distributed ledger has been updated (e.g., by a fog node that is located higher in the hierarchy).

In some implementations, the method 500 includes updating the configuration information stored in the distributed ledger based on a consensus between the plurality of fog nodes that are maintaining the distributed ledger. For example, in some implementations, the method 500 includes updating the configuration information in response to a majority of the plurality of fog nodes (e.g., more than 50%) agreeing to update the configuration information.

In some implementations, the method 500 includes, prior to storing the configuration information in the distributed ledger, determining whether the configuration information satisfies a security criterion associated with the device. In such implementations, the method 500 includes storing the configuration information in the distributed ledger in response to determining that the configuration information satisfies the security criterion associated with the device. In some implementations, the method 500 includes scanning the configuration information for malicious code (e.g., malware). In some implementations, the method 500 includes verifying that the configuration information is digitally signed by an entity that is authorized to provide the configuration information.

In some implementations, the method 500 includes tracking devices that join and/or leave a network (e.g., the IoT network). In such implementations, the method 500 includes updating the distributed ledger to indicate the devices that have joined/left the network. In various implementations, devices are provided a set of initial credentials (e.g., at the factory) that are stored in the distributed ledger. In some implementations, the method 500 includes determining that a particular device has joined the network when that particular device provides the credentials that are associated with the device.

In some implementations, the method 500 includes receiving a request for a change in configuration from the device. In such implementations, the method 500 includes determining, based on the configuration information stored in the distributed ledger, whether the requested change indicated by the request satisfies one or more security constraints associated with a network that includes the device. In some implementations, the method 500 includes transmitting the configuration information in response to determining that the change satisfies the one or more security constraints. In some implementations, the method 500 includes discarding the request in response to determining that the change breaches (e.g., does not satisfy) the one or more security constraints. For example, a light bulb requests a change in its configuration so that the light bulb can turn OFF motion detection. In this example, the method 500 includes determining whether there is a motion detector near the light bulb that can detect motion when the light bulb is not detecting motion. If there is a motion detector that can detect motion when the light bulb is not detecting motion, the method 500 includes providing the configuration information to the light bulb so that the light bulb can turn OFF motion detection. However, if there is no motion detector near the light bulb or the motion detector cannot detect motion in the area covered by the light bulb, then the method 500 includes denying the request for the change in configuration.

Figure 6:
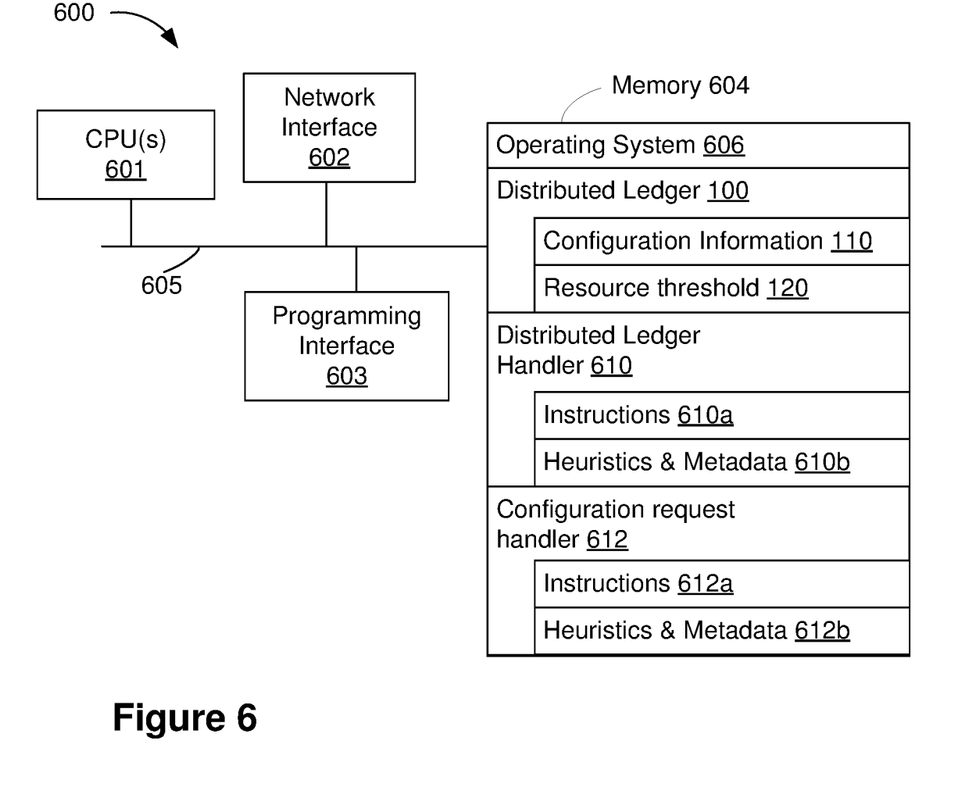
FIG. 6 is a block diagram of a server system enabled with various modules that are provided to configure resource-constrained devices in a network in accordance with some implementations.

FIG. 6 is a block diagram of a server system 600 enabled with one or more components of a device (e.g., a fog node, for example, one or more of the local fog nodes 30, the neighborhood fog nodes 40, the regional fog nodes 50 and/or the cloud computing servers 60 shown in FIG. 1) that provides configuration information to devices (e.g., the configuration information 110 to the endpoints 20). While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 includes one or more processing units (CPUs) 601, a network interface 602, a programming interface 603, a memory 604, and one or more communication buses 605 for interconnecting these and various other components.

In some implementations, the network interface 602 is provided to, among other uses, establish and maintain a metadata tunnel between a cloud hosted network management system and at least one private network including one or more compliant devices. In various implementations, the network interface 602 allows the server system 600 to communicate with devices that are upstream or downstream relative to the server system 600 in a hierarchy. In some implementations, the communication buses 605 include circuitry that interconnects and controls communications between system components. The memory 604 includes high-speed random access memory, such as DRAM, SRAM, DDR RAM or other random access solid state memory devices and may include non-volatile memory, such as one or more magnetic disk storage devices, optical disk storage devices, flash memory devices, or other non-volatile solid state storage devices. The memory 604 optionally includes one or more storage devices remotely located from the CPU(s) 601. The memory 604 comprises a non-transitory computer readable storage medium.

In some implementations, the memory 604 or the non-transitory computer readable storage medium of the memory 604 stores the following programs, modules and data structures, or a subset thereof including an optional operating system 606, an instance of the distributed ledger 100 (e.g., a copy of the distributed ledger 100), a distributed ledger handler 610, and a configuration request handler 612. As described herein, the distributed ledger 100 stores configuration information 110 for various devices (e.g., the endpoints 20 shown in FIG. 1). The distributed ledger 100 is associated with the resource threshold 120. In the example of FIG. 6, the server system 600 is able to maintain the distributed ledger 100 because the CPU(s) 601, the network interface 602, the programming interface 603 and the memory 604 collectively satisfy the resource threshold 120 associated with the distributed ledger 100.

In various implementations, the distributed ledger handler 610 maintains the distributed ledger 100. For example, in some implementations, the distributed ledger handler 610 accesses the distributed ledger 100 to retrieve the configuration information 110 from the distributed ledger 100. In some implementations, the distributed ledger handler 610 ensures that the instance of the distributed ledger 100 stored on the server system 600 is synchronized with instances of the distributed ledger 100 stored elsewhere. In some implementations, the distributed ledger handler 610 writes information to the distributed ledger 100 (e.g., after a consensus is reached with other entities that store instances of the distributed ledger 100). For example, the distributed ledger handler 610 updates the distributed ledger 100 to indicate that the configuration information 110 has been transmitted to a particular device (e.g., to a particular endpoint 20 shown in FIG. 1, for example, to light bulb abc). In some implementations, the distributed ledger handler 610 updates the distributed ledger 100 to indicate acknowledgements received from devices to which the configuration information was transmitted. To that end, in various implementations, the distributed ledger handler 610 includes instructions and/or logic 610a, and heuristics and metadata 610b.

In various implementations, the configuration request handler 612 handles (e.g., interprets and/or acts on) requests for configuration information. In some implementations, the configuration request handler 612 authenticates requests for configuration information based on information that is stored in the distributed ledger 100. In some implementations, in response to a successful authentication of the request, the configuration request handler 612 requests the distributed ledger handler 610 to retrieve the configuration information 110 from the distributed ledger 100 and transmits the configuration information 110 to the device via the network interface 602. In some implementations, the configuration request handler 612 discards the request in response to a failure to authenticate the request for configuration information. To that end, in various implementations, the configuration request handler 612 includes instructions and/or logic 612a, and heuristics and metadata 612b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    maintaining, at a first fog node of a plurality of fog nodes that are communication with one or more downstream devices at a lower hierarchical level, a distributed ledger in coordination with the plurality of fog nodes, wherein the distributed ledger stores configuration information that is associated with the one or more downstream devices, wherein the configuration information satisfies a chain of trust from the plurality of fog nodes down to the one or more downstream devices, the chain of trust indicating authenticity of the configuration information;

obtaining a request for configuration information from a device of the one or more downstream devices that breaches a resource threshold associated with the distributed ledger, wherein the resource threshold is indicative of resources required to maintain the distributed ledger; and transmitting, to the device, the configuration information associated with the device in order to allow the device to be configured in accordance with the configuration information while the device breaches the resource threshold associated with the distributed ledger.

2. The method of claim 1, wherein the device does not have one or more of the resources indicated by the resource threshold; and wherein the plurality of fog nodes that maintain the distributed ledger satisfy a latency threshold associated with the distributed ledger.

3. The method of claim 1, further comprising:

updating the configuration information stored in the distributed ledger based on a consensus between the plurality of fog nodes.

4. The method of claim 1, further comprising:

prior to storing the configuration information in the distributed ledger, determining whether the configuration information satisfies a security criterion associated with the device; and storing the configuration information in the distributed ledger in response to determining that the configuration information satisfies the security criterion associated with the device.

5. The method of claim 1, further comprising:

prior to transmitting the configuration information to the device, authenticating the request.

6. The method of claim 5, wherein authenticating the request comprising:

determining whether the device requesting the configuration information is part of a network.

7. The method of claim 1, further comprising:

obtaining an indication that the device has joined a network; and updating the distributed ledger to indicate that the device has joined the network.

8. The method of claim 1, wherein the request includes a request for a change in configuration, the method further comprising:

determining, based on the configuration information stored in the distributed ledger, whether the change indicated by the request satisfies one or more security constraints associated with a network that includes the device; and transmitting the configuration information in response to determining that the change satisfies the one or more security constraints.

9. A fog node of a plurality of fog nodes that are communication with one or more downstream devices at a lower hierarchical level, comprising:

a processor provided to execute computer readable instructions included on a non-transitory memory; and a non-transitory memory including computer readable instructions; that when executed by the processor, cause the fog node to:

maintain a distributed ledger in coordination with the plurality of fog nodes, wherein the distributed ledger stores configuration information that is associated with the one or more downstream devices, wherein the configuration information satisfies a chain of trust from the plurality of fog nodes down to the one or more downstream devices, the chain of trust indicating authenticity of the configuration information;

obtain a request for configuration information from a device of the one or more downstream devices that breaches a resource threshold associated with the distributed ledger, wherein the resource threshold is indicative of resources required to maintain the distributed ledger; and transmit, to the device, the configuration information associated with the device in order to allow the device to be configured in accordance with the configuration information while the device breaches the resource threshold associated with the distributed ledger.

10. The fog node of claim 9, wherein the device does not have one or more of the resources indicated by the resource threshold; and wherein the plurality of fog nodes that maintain the distributed ledger satisfy a latency threshold associated with the distributed ledger.

11. The fog node of claim 9, wherein the instructions further cause the fog node to:

update the configuration information stored in the distributed ledger based on a consensus between the plurality of fog nodes.

12. The fog node of claim 9, wherein the instructions further cause the fog node to:

prior to storing the configuration information in the distributed ledger, determine whether the configuration information satisfies a security criterion associated with the device; and store the configuration information in the distributed ledger in response to determining that the configuration information satisfies the security criterion associated with the device.

13. The fog node of claim 9, wherein the instructions further cause the fog node to:

prior to transmitting the configuration information to the device, authenticate the request.

14. The fog node of claim 13, wherein authenticating the request comprising:

determining whether the device requesting the configuration information is part of a network.

15. The fog node of claim 9, wherein the instructions further cause the fog node to:

obtain an indication that the device has joined a network; and update the distributed ledger to indicate that the device has joined the network.

16. The fog node of claim 9, wherein the request includes a request for a change in configuration, the instructions further cause the fog node to:

determine, based on the configuration information stored in the distributed ledger, whether the change indicated by the request satisfies one or more security constraints associated with a network that includes the device; and transmit the configuration information in response to determining that the change satisfies the one or more security constraints.

17. A non-transitory computer readable storage medium storing one or more programs, the one or more programs comprising instructions, which, when executed by a first fog node of a plurality of fog nodes that are communication with one or more downstream devices at a lower hierarchical level, cause the first fog node to perform or cause performance of:

maintaining a distributed ledger in coordination with the plurality of fog nodes, wherein the distributed ledger stores configuration information that is associated with one or more downstream devices, wherein the configuration information satisfies a chain of trust from the plurality of fog nodes down to the one or more downstream devices, the chain of trust indicating authenticity of the configuration information;

obtaining a request for configuration information from a device of the one or more downstream devices that breaches a resource threshold associated with the distributed ledger, wherein the resource threshold is indicative of resources required to maintain the distributed ledger; and transmitting, to the device, the configuration information associated with the device in order to allow the device to be configured in accordance with the configuration information while the device breaches the resource threshold associated with the distributed ledger.

18. The non-transitory computer readable storage medium of claim 17, wherein the device does not have one or more of the resources indicated by the resource threshold; and wherein the plurality of fog nodes that maintain the distributed ledger satisfy a latency threshold associated with the distributed ledger.

* * * * *

UNITED STATES PATENT AND TRADEMARK OFFICE
CERTIFICATE OF CORRECTION

PATENT NO.         : 10,826,762 B2
APPLICATION NO.    : 16/056012
DATED              : November 3, 2020
INVENTOR(S)        : Charles Calvin Byers et al.

Page 1 of 1

It is certified that error appears in the above-identified patent and that said Letters Patent is hereby corrected as shown below:

In the Claims

Column 14, Line 56, should read:
A method, comprising:

Column 15, Line 60, should read:
Instructions that, when executed by the processor, Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*